United States Patent
Lenny et al.

(10) Patent No.: US 6,412,089 B1
(45) Date of Patent: Jun. 25, 2002

(54) BACKGROUND READ SCANNING WITH DEFECT REALLOCATION

(75) Inventors: Thomas R. Lenny; Edward J. Chen, both of Longmont, CO (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/259,393

(22) Filed: Feb. 26, 1999

(51) Int. Cl.[7] .............................................. G11C 29/00
(52) U.S. Cl. ...................................... 714/769; 714/718
(58) Field of Search .............................. 714/769, 770, 714/771, 763, 766, 710, 711, 718, 723, 714; 360/131, 132, 133, 134

(56) References Cited

U.S. PATENT DOCUMENTS

| | | | |
|---|---|---|---|
| 3,704,363 A | 11/1972 | Salmassy et al. | 235/153 |
| 4,268,905 A | 5/1981 | Johann et al. | 364/200 |
| 4,348,761 A | 9/1982 | Berger | 371/21 |
| 4,725,968 A | 2/1988 | Baldwin et al. | 364/550 |
| 4,841,389 A | 6/1989 | Hoyt et al. | 360/75 |
| 5,067,128 A | 11/1991 | Nakane | 371/5.5 |
| 5,367,670 A | 11/1994 | Ward et al. | 395/575 |
| 5,371,882 A | 12/1994 | Ludlam | 395/575 |
| 5,410,439 A | 4/1995 | Egbert et al. | 360/75 |
| 5,422,890 A * | 6/1995 | Klingsporn et al. | 714/723 |
| 5,469,463 A | 11/1995 | Polich et al. | 395/182.18 |
| 5,471,617 A | 11/1995 | Farrand et al. | 395/700 |
| 5,500,940 A | 3/1996 | Skeie | 395/183.18 |
| 5,539,592 A | 7/1996 | Banks et al. | 360/75 |
| 5,557,183 A | 9/1996 | Bates et al. | 318/434 |
| 5,559,958 A | 9/1996 | Farrand et al. | 395/183.03 |
| 5,566,316 A | 10/1996 | Fechner et al. | 395/182.04 |
| 5,737,519 A | 4/1998 | Abdelnour et al. | 395/183.15 |
| 5,828,583 A | 10/1998 | Bush et al. | 364/551.01 |
| 5,844,911 A * | 12/1998 | Schadegg et al. | 714/710 |
| 5,761,411 A | 6/1999 | Teague et al. | 395/184.01 |
| 6,101,619 A * | 8/2000 | Shin | 714/710 |

OTHER PUBLICATIONS

Predictive Failure Analysis,: IBM Corporation, believed to be made public Nov. 1994.
Blachek, Michael D. and Iverson, David E.; "Predictive Failure Analysis–Advanced Condition Monitoring," IBM Corporation, believed to be made public Nov. 1994.
Colegrove, Dan; "Informational Exception Condition Reporting," ATA–3 Proposal (X3T10/95–111r1), IBM Corporation; Mar. 1, 1995.

* cited by examiner

*Primary Examiner*—Christine T. Tu
(74) *Attorney, Agent, or Firm*—Sharp, Comfort & Merrett, P.C.

(57) ABSTRACT

A method, apparatus and computer system for correcting errors and defects in a storage device. The storage device includes media for storing data. A periodic read scan is performed to test the data. If a repeatable error is found, the data is moved to a new sector from a pool of available sectors. Defects are counted and identified in a defect list for reporting to the host. The storage device is scannable is small segments to minimize impact on performance.

32 Claims, 10 Drawing Sheets

FIG. 3A

| REGISTER | 7 | 6 | 5 | 4 | 3 | 2 | 1 | 0 |
|---|---|---|---|---|---|---|---|---|
| FEATURES | D0h ||||||||
| SECTOR COUNT | | | | | | | | |
| SECTOR NUMBER | | | | | | | | |
| CYLINDER LOW | 4Fh |||||||| 
| CYLINDER HIGH | C2h ||||||||
| DEVICE/HEAD | 1 | | 1 | D | | | | |
| COMMAND | B0h ||||||||

| DATA REGISTER | 7 | 6 | 5 | 4 | 3 | 2 | 1 | 0 |
|---|---|---|---|---|---|---|---|---|
| DATA0 | b7 | b6 | b5 | b4 | b3 | b2 | b1 | b0 |
| DATA1 | b15 | b14 | b13 | b12 | b11 | b10 | b9 | b8 |

| STATUS REGISTER |||| ERROR REGISTER ||||
|---|---|---|---|---|---|---|---|
| DRDY | DF | CORR | ERR | UNC | IDNF | ABRT | TKONF | AMNF |
| VALID | | VALID | | | VALID | | | |

FIG. 3B

| DESCRIPTION | BYTES | FORMAT | TYPE |
|---|---|---|---|
| DATA STRUCTURE REV. NO. =0x0005 | 2 | BINARY | RD ONLY |
| 1st DRIVE ATTRIBUTE | 12 | | RD/WR |
| ⋮ | ⋮ | ⋮ | ⋮ |
| 30th DRIVE ATTRIBUTE | 12 | | RD/WR |
| OFF-LINE DATA COLLECTION STATUS | 1 | | RD ONLY |
| RESERVED | 1 | | |
| TOTAL TIME (SEC) TO COMPLETE NEXT SEGMENT | 2 | | RD ONLY |
| RESERVED | 1 | | |
| OFF-LINE DATA COLLECTION CAPABILITY | 1 | | RD ONLY |
| DRIVE FAILURE PREDICTION CAPABILITY | 2 | | |
| DRIVE ERROR LOGGING CAPABILITY | 1 | BINARY | RD ONLY |
| RESERVED (0x00) | 15 | | RD/WR |
| VENDOR UNIQUE | 125 | | RD ONLY |
| DATA STRUCTURE CHECKSUM | 1 | | RD ONLY |
| TOTAL BYTES | 512 | | |

FIG. 3C

| | DESCRIPTION | BYTES | FORMAT | TYPE |
|---|---|---|---|---|
| 342 | ATTRIBUTE ID NUMBER | 1 | BINARY | RD ONLY |
| 344 | STATUS FLAG | 2 | BIT FLAGS | RD ONLY |
| | BIT 0 | | | |
| | BIT 1 | | | |
| | BIT 2 | | | |
| | BIT 3 | | | |
| 346 | ATTRIBUTE VALUE | 2 | BINARY | RD ONLY |
| | VENDOR SPECIFIC | 8 | BINARY | RD ONLY |
| | TOTAL BYTES | 12 | | |

FIG. 3D

| VALUE | DEFINITION |
|---|---|
| 00H | OFF-LINE DATA COLLECTION ACTIVITY WAS NEVER STARTED |
| 01H | RESERVED |
| 02H | OFF-LINE DATA COLLECTION ACTIVITY WAS COMPLETED WITHOUT ERROR |
| 03H | RESERVED |
| 04H | OFF-LINE DATA COLLECTION ACTIVITY WAS SUSPENDED BY AN INTERRUPTING COMMAND FROM POST |
| 05H | OFF-LINE DATA COLLECTION ACTIVITY WAS ABORTED BY AN INTERRUPTING COMMAND FROM HOST |
| 06H | OFF-LINE DATA COLLECTION ACTIVITY WAS ABORTED BY THE DEVICE WITH A FATAL ERROR |
| 07H-3FH | RESERVED |
| 40H-7FH | VENDOR SPECIFIC |
| 80H | OFF-LINE DATA COLLECTION ACTIVITY WAS NEVER STARTED. THE AUTO-OFF-LINE FEATURE IS ENABLED |
| 81H | RESERVED |
| 82H | OFF-LINE DATA COLLECTION ACTIVITY WAS COMPLETED WITHOUT ERROR. THE AUTO-OFF-LINE FEATURE IS ENABLED |
| 83H | RESERVED |
| 84H | OFF-LINE DATA COLLECTION ACTIVITY WAS SUSPENDED BY AN INTERRUPTING COMMAND FROM HOST. THE AUTO-OFF-LINE FEATURE IS ENABLED |
| 85H | OFF-LINE DATA COLLECTION ACTIVITY WAS ABORTED BY AN INTERRUPTING COMMAND FROM HOST. THE AUTO-OFF-LINE FEATURE IS ENABLED |
| 86H | OFF-LINE DATA COLLECTION ACTIVITY WAS ABORTED BY THE DEVICE WITH A FATAL ERROR. THE AUTO-OFF-LINE FEATURE IS ENABLED |
| 87H-BFH | RESERVED |
| C0H-FFH | VENDOR SPECIFIC |

FIG. 3E

| BIT | DEFINITION |
|---|---|
| 0 | OFF-LINE IMMEDIATE COMMAND<br>0=NOT SUPPORTED<br>1=SUPPORTED |
| 1 | ENABLE AUTOMATIC OFF-LINE<br>0=NOT SUPPORTED<br>1=SUPPORTED |
| 2 | ABORT OFF-LINE BY HOST<br>0=SUSPEND/RESUME<br>1=ABORT |
| 3 | OFF-LINE READ SCANNING WITH DEFECT REALLOCATION<br>0=NOT SUPPORTED<br>1=SUPPORTED |
| 4-7 | RESERVED |

| LOGGING SECTOR NUMBER | PURPOSE | R/W |
|---|---|---|
| 00h | RESERVED | TBD |
| 01h | SMART DRIVE ERROR LOGGING | RO |
| 02h-05h | RESERVED FOR SMART ERROR LOG EXTENSION | RO |
| 06h | RESERVED FOR DRIVE SELF-TEST | RO |
| 07h-7Fh | RESERVED | TBD |
| 80h-9Fh | HOST VENDOR SPECIFIC | R/W |
| A0h-BFh | DEVICE VENDOR SPECIFIC | VS |
| C0h-FFh | VENDOR SPECIFIC | VS |

KEY -
RO - SECTOR IS READ ONLY BY THE HOST
R/W - SECTOR IS READ OR WRITE BY THE HOST
TBD - SECTOR IS RESERVED AND READ/WRITE STATUS WILL BE ASSIGNED WHEN THE ADDRESS IS ASSIGNED
VS - SECTOR IS VENDOR SPECIFIC THUS READ/WRITE ABILITY IS VENDOR SPECIFIC

FIG. 4B

| DESCRIPTION | BYTES | FORMAT | TYPE |
|---|---|---|---|
| S.M.A.R.T. DRIVE ERROR LOGGING VERSION=1 | 1 | DECIMAL | RD ONLY |
| ERROR LOG DATA STRUCTURE POINTER | 1 | DECIMAL | RD ONLY |
| 1st ERROR ATTRIBUTE | 90 | SEE TABLE 7 | |
| ○ ○ ○ | ○ ○ ○ | ○ ○ ○ | ○ ○ ○ |
| 5th ERROR ATTRIBUTE | 90 | SEE TABLE 7 | |
| ATA DEVICE ERROR COUNT (MANDATORY) | 2 | BINARY | RD ONLY |
| RESERVED | 57 | | |
| DATA STRUCTURE CHECKSUM | 1 | BINARY | RD ONLY |
| TOTAL BYTES | 512 | | |

FIG. 4C

| DESCRIPTION | BYTES | FORMAT | TYPE |
|---|---|---|---|
| 1st COMMAND DATA STRUCTURE | 12 | SEE TABLE 4 | |
| ○ ○ ○ | ○ ○ ○ | ○ ○ ○ | ○ ○ ○ |
| 5th COMMAND DATA STRUCTURE | 12 | SEE TABLE 4 | |
| ERROR DATA STRUCTURE | 30 | SEE TABLE 6 | |
| TOTAL BYTES | 90 | | |

FIG. 4D

| DESCRIPTION | BYTES | FORMAT | TYPE |
|---|---|---|---|
| WRITE REGISTER | | | |
| DEVICE CONTROL REGISTER | 1 | BINARY | RD ONLY |
| FEATURES REGISTER | 1 | BINARY | RD ONLY |
| SECTOR COUNT | 1 | BINARY | RD ONLY |
| SECTOR NUMBER | 1 | BINARY | RD ONLY |
| CYLINDER LOW | 1 | BINARY | RD ONLY |
| CYLINDER HIGH | 1 | BINARY | RD ONLY |
| DRIVE/HEAD | 1 | BINARY | RD ONLY |
| COMMAND REGISTER | 1 | BINARY | RD ONLY |
| COMMAND TIMESTAMP (MILLISECONDS FROM POWER-ON) | 4 | BINARY | RD ONLY |
| TOTAL BYTES | 12 | | |

FIG. 4E

| DESCRIPTION | BYTES | FORMAT | TYPE |
|---|---|---|---|
| READ REGISTER | | | |
| RESERVED | 1 | BINARY | RD ONLY |
| ERROR REGISTER | 1 | BINARY | RD ONLY |
| SECTOR COUNT | 1 | BINARY | RD ONLY |
| SECTOR NUMBER | 1 | BINARY | RD ONLY |
| CYLINDER LOW | 1 | BINARY | RD ONLY |
| CYLINDER HIGH | 1 | BINARY | RD ONLY |
| DRIVE/HEAD | 1 | BINARY | RD ONLY |
| STATUS REGISTER | 1 | BINARY | RD ONLY |
| EXTENDED ERROR DATA | 19 | BINARY | RD ONLY |
| STATE | 1 | SEE TABLE 5 | |
| LIFE TIMESTAMP (LIFE OF THE DRIVE IN HOURS) | 2 | BINARY | RD ONLY |
| TOTAL BYTES | 30 | | |

FIG. 4F

| BITS 3-0 | DEFINITION |
|---|---|
| 0 | UNKNOWN |
| 1 | SLEEP |
| 2 | STANDBY |
| 3 | ACTIVE/IDLE |
| 4 | S.M.A.R.T. OFF-LINE OR SELF-TEST |
| 5-10 | RESERVED |
| 11-15 | VENDOR SPECIFIC |
| BITS 7-4 | DEFINITION |
| 0-15 | VENDOR SPECIFIC |

BACKGROUND READ SCANNING WITH DEFECT REALLOCATION

CROSS-REFERENCE TO RELATED APPLICATIONS

This application is related to U.S. patent application Ser. No. 09/259,622, entitled "Drive Error Logging", filed concurrently herewith and hereby incorporated by reference herein.

This application is related to U.S. patent application Ser. No. 09/258,858, entitled "Self Testing Disk Drive", filed concurrently herewith and hereby incorporated by reference herein.

This application is related to U.S. patent application Ser. No. 09/076,300, entitled "Method for Performing DFP Operations", filed May 11, 1998, which is a continuation of U.S. Pat. No. 5,761,411, which is a continuation-in-part of U.S. patent application Ser. No. 08/404,812 filed Mar. 13, 1995 entitled "Drive Failure Prediction Techniques for ATA Disk Drives", now abandoned, all of which are hereby incorporated by reference herein.

This application is related to U.S. Pat. No. 5,828,583, which is a continuation of U.S. patent application Ser. No. 08/404,812 filed Mar. 13, 1995 entitled "Drive Failure Prediction Techniques for ATA Disk Drives", now abandoned, all of which are hereby incorporated by reference herein.

BACKGROUND OF THE INVENTION

1. Field of the Invention

The present invention relates generally to disk fault correction techniques for storage devices and, more particularly, to a method of correcting disk drive media faults while the hard drive is idle.

2. Description of Related Art

The vast majority of personal computer (PC) systems available today come equipped with a peripheral data storage device such as a hard disk (HD) drive. Hard disks are comprised of rigid platters, made of aluminum alloy or a mixture of glass and ceramic, covered with a magnetic coating. Platters vary in size and hard disk drives generally come in two form factors, 5.25 in or 3.5 in. Typically, two or more platters are stacked on top of each other with a common spindle that turns the whole assembly at several thousand revolutions per minute. There is a gap between the platters, making room for a magnetic read/write head, mounted on the end of an actuator arm. There is a read/write head for each side of each platter, mounted on arms which can move them radially. The arms are moved in unison by a head actuator, which contains a voice coil—an electromagnetic coil that can move a magnet very rapidly.

Each platter is double-sided and divided into tracks. Tracks are concentric circles around the central spindle. Tracks physically above each other on the platters are grouped together into a cylinder. Cylinders are further divided into sectors. Depending on the disk drive vendor, a sector is typically comprised of 512 bytes of user data, followed by a number or number of cross-check bytes, a number of error correction code (ECC) bytes and other vendor specific diagnostic information. Thus, these devices are complex electro-mechanical devices and, as such, can suffer performance degradation or failure due to a single event or a combination of events.

There are generally two general classes of failures that can occur in disk drives. The first class is the "catastrophic" type of failure which causes the drive to quickly and unpredictably fail. These failures can be caused by static electricity, handling damage, or thermal-related solder problems. Probably, the only way to prevent these failures, if at all, is through more controlled manufacturing and handling processes. Certainly, there is little hope of predicting these types of failures once the drive it put in service.

The second class of failures result from the gradual decay of other electrical and/or mechanical components within the drive after it is put in service. Before this larger class of failures is discussed, it is important to understand some of the correction schemes built into the disk drives to overcome the most common failure—media defects.

Most drives include an error detection mechanism to catch errors during read operations. While this type of defect correction is adequate to catch defects as the sectors are read, it does nothing to catch latent defects in sectors that have not been read. This is important since sometimes data is not read back from the disk for a very long time after it has been written. As time passes, defects sometimes grow past the point of correctability. Thus, this technique is only adequate for on the fly correcting.

Historically, there are also several ways for users to manage this class of failure:

1. Do nothing but wait for the drive to fail and then replace the drive. This is the easiest but will cause much down time and lost data when the drive fails.
2. Practice periodic preventative maintenance and simply replace the drive before it fails. This is somewhat effective in reducing unscheduled down time but suffers from the high cost of replacing drives before their life has been exhausted.
3. Use redundancy or backups. This technique is also effective in reducing unscheduled down time. It does not require the drives to be replaced before they fail, but suffers from the cost of having duplicate or additional hardware.
4. Rely on the disk drives built in error correction schemes to make corrections as the data is read.
5. Use Predictive Failure Analysis (PFA). Because this second class of failure can occur over time, it is possible to predict these types of failures by monitoring conditions of the drive.

Disk Drive Error Correction and Detection

Because disk drives are inherently defect prone, error correction scans are performed on the disk drives at the factory for marking any defective sectors before the drives are put into service. Disk drives also have error checking built in for field use. Each sector includes a number of ECC bytes and cross-check bytes. The cross-check bytes are used to double check the main ECC correction and reduce the probability of miscorrection. The cross-check and ECC bytes are computed and appended to the user data when the sector is first written with data Each time the drive reads a sector of data, it generates a new set of ECC and cross-check bytes based on the 512 bytes of data contained within the sector. The new set of cross-check and ECC bytes is compared with the corresponding bytes originally written in that particular sector. This comparison process results in bytes that are known as syndromes. If all of the syndrome values are zero, the data has been read with no errors, and the sector of data is transferred to a host computer. If any of the syndromes are non-zero, an error has occurred. The type of correction applied by the drive then depends on the nature and extent of the error and the vendor's proprietary techniques.

When a data error occurs, the disk drive checks to see if the error is correctable on the fly. If correctable on the fly, the error is corrected and the data is transferred to the host system. Errors corrected in this manner are invisible to the host system.

If the data is not correctable on the fly, the sector is typically re-read a number of times in an attempt to read the data correctly before applying more sophisticated correction algorithms. This strategy prevents invoking correction on non-repeatable or soft errors. Each time a sector in error is re-read, a set of ECC syndromes is computed. If all of the syndrome values are zero, the data was read with no errors, and the sector is transferred to the host system. If any of the syndromes are not zero, an error has occurred, the syndromes are retained, and another re-read is invoked. Depending on the disk drive vendor, the drive typically attempts a number of re-reads with more sophisticated ECC algorithms. If an automatic read reallocation feature is enabled, the drive, when encountering defective sectors can easily and automatically reallocate the defective sector to a good sector. (Most drives include an automatic read reallocation feature which, when set, indicates that the drive will enable automatic reallocation of bad sectors when encountered).

Most drives allocate a number of spare sector pools, each pool containing a small number of spare sectors. If a sector on a cylinder is found to be defective, the address of the sector is added to the drive's defect list. Sectors located physically subsequent to the defective sector are assigned logical block addresses such that a sequential ordering of logical blocks is maintained. This inline sparing technique is employed in an attempt to eliminate slow data transfer that would result from a single defective sector on a cylinder. If more than the number of spare sectors in a single pool are found defective, the above inline sparing technique is applied to the to the single pool only. The remaining defective sectors are replaced with the nearest available pool of spares.

Defects that occur in the field are known as grown defects. Sectors are considered to contain grown defects if the sophisticated ECC algorithm must be applied to recover the data. If this algorithm is successful, the corrected data is stored in the newly allocated sector. If the algorithm is not successful, a pending defect will be added to the defect list. Any subsequent read to the original logical block will return an error if the read is not successful. A host command to over-write the location will result in multiple write/read/verifies of the suspect location. If any of the multiple write/read/verifies fail, the new data will be written to a spare sector, and the original location will be added to the permanent defect list. If all multiple write/read/verifies pass, data will be written to the location, and the pending defect will be removed from the defect list.

Predictive Failure Analysis

PFA monitors key drive performance indicators for change over time or exceeding specified limits. This technique has become known in the industry as Self-Monitoring, Analysis and Reporting Technology (S.M.A.R.T., hereinafter simply SMART).

SMART is an industry standard for both Small Computer System Interface (SCSI) and PC-AT Attachment (ATA) disk drive interfaces. The SMART standard for SCSI devices is defined in the American National Standards Institute (ANSI) SCSI Informational Exception Control (EEC) document X3T10/94-190 which is hereby incorporated by reference herein. The SMART standard for ATA devices is defined in the Small Form Factor (SFF) document SFF-8035, entitled "Self-Monitoring, Analysis and Reporting Technology," Revision 2.0, dated Apr. 1, 1996, (hereinafter referred to as the SMART specification) which is hereby incorporated by reference herein.

PFA and SMART techniques are disclosed in U.S. Pat. No. 5,828,583 to Bush et al, incorporated herein by reference. These techniques monitor device performance, analyze data from periodic internal measurements, and recommend replacement when specific thresholds are exceeded. The thresholds are determined by examining the history logs of disk drives that have failed in the field. In the first incarnation of SMART, the host computer polled the disk drive on a periodic basis to determine whether the disk drive was failing. In subsequent revisions, when commanded by the host computer the disk drive makes the determination and simply reports the status. When a failure is deemed imminent, the host computer signals end user or a system administrator. With sufficient warning, users have the opportunity to back up vital data and replace suspect drives prior to data loss or unscheduled down time.

Thus, as hard drive technology evolves to provide ever increasing amounts of data storage, a more proactive way of predicting and correcting the drive failures predicted by the PFA and SMART techniques is desired.

SUMMARY OF THE INVENTION

According to a preferred embodiment, the present invention includes a method, apparatus and computer system for detecting and correcting errors in a storage device. The storage device includes media that is addressable in small units, such as sectors, for storing data. Periodically, the storage device scans the media for errors and defects. If a data error is correctable, the data is rewritten to the media and tested again. If the error repeats, the media is deemed defective and the data is relocated to another sector.

Preferably, the scanning is performed during idle periods. The storage device waits for a certain usage period to expire before scanning the entire storage device. Once passed, the storage device waits for the device to be idle before performing one or more scans. The media is preferably scanned in segments comprising a plurality of sectors so that the device scanning operation can be broken into smaller operations. After a segment is complete, the storage device calculates the elapsed time to scan the last segment and stores the value.

The storage device maintains a count of the number of defects and defective sectors are identified in a defect list.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 3A is a table illustrating a command block according to a preferred embodiment of the storage device;

FIG. 3B is a table illustrating a data structure according to a preferred embodiment;

FIG. 3C is a table illustrating an attribute data structure of the drive attribute of FIG. 3B. according to a preferred embodiment;

FIG. 3D is a table illustrating status values for an off-line data collection status register according to a preferred embodiment;

FIG. 3E is a table illustrating possible values of an off-line data collection capability of FIG. 3B, according to the preferred embodiment;

FIG. 4A is a table illustrating logging sectors of the storage device, according to the preferred embodiment;

FIG. 4B is a table illustrating an error logging sector data structure of the storage device, according to the preferred embodiment;

FIG. 4C is a table illustrating an error log data structure of FIG. 4B, according to the preferred embodiment;

FIG. 4D is a table illustrating a command data structure of FIG. 4B, according to the preferred embodiment;

FIG. 4E is a table illustrating an error data structure of FIG. 4C, according to the preferred embodiment;

FIG. 4F is a table illustrating operating state codes of the storage device, according

DESCRIPTION OF ILLUSTRATIVE EMBODIMENTS

Figure 1:
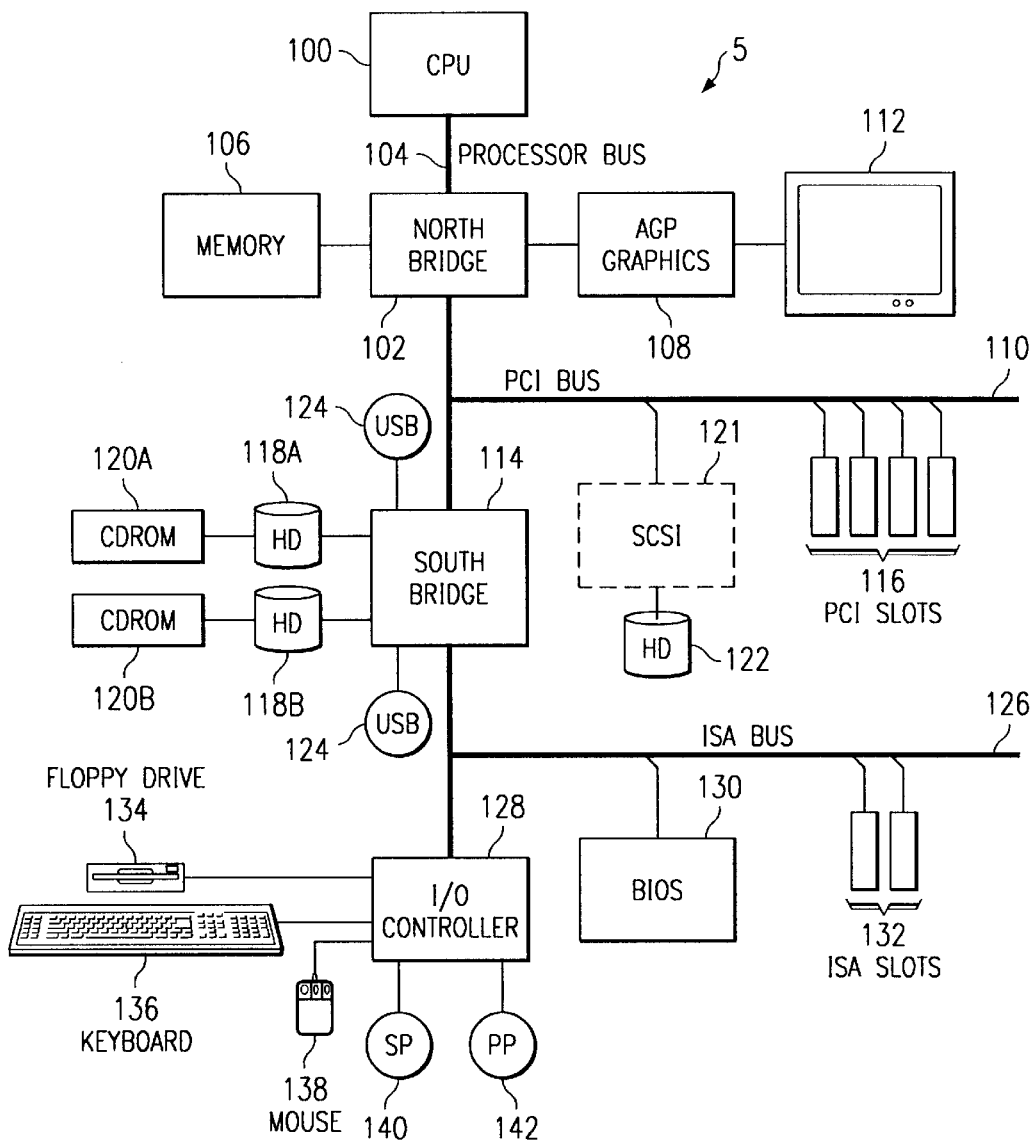
FIG. 1 is a block diagram of a computer system according to a preferred embodiment.

Referring first to FIG. 1, there is illustrated a computer system S, for example a personal computer (or "PC"). While the computer system S shown is of an International Business Machines (IBM) PC variety, the principles of the present invention are equally applicable to other computer platforms or architectures, such as those associated with by IBM, Apple, Sun and Hewlett Packard. While the following description is limited to typical components of an IBM-PC platform, it is understood that corresponding components from alternative platforms could be used. For example, in an IBM-PC an Intel processor is typical whereas in an Apple computer a Power-PC processor is typical. The invention is also applicable to other devices employing disk drives, such as printers, voice-mail systems and other specialized electronic devices.

As is conventional in the art, the computer system S includes a central processing unit (CPU) or, simply, processor 100, such as an Intel Pentium II microprocessor or the like. It is understood that alternative processors from Intel, AMD, Cyrix and others may be used. A multiprocessor architecture is also compatible with the present invention. The processor 100 is coupled to a north bridge 102 by a host or processor bus 104. The north bridge 102 includes a memory controller for coupling to an array of memory 106, an Accelerated Graphics Port (AGP) interface for coupling to an AGP graphics controller 108, and a Peripheral Component Interconnect (PCI) interface for providing a PCI bus The AGP graphics controller 108 is further connectable to a monitor or display 112.

In the computer system S, the PCI bus 110 couples the north bridge 102 to a south bridge 114 and a number of PCI slots 116 for receiving expansion cards, such as a network interface controller (not shown) or a Small Computer System Interface (SCSI) controller 121.

The south bridge 114 is a integrated multifunctional component that includes a number of functions. For example, an enhanced direct memory access (DMA) controller, interrupt controller, timer, integrated drive electronics (IDE) interface, a universal serial bus (USB) host controller and an industry standard architecture (ISA) bus controller for providing an ISA bus 126. The IDE interface is a two channel interface supporting up to four IDE devices, such as a hard disk drive 118 (specifically 118a and 118b) and a compact disk read only memory CD-ROM 120 (specifically 120a and 120b). As an alternative to IDE hard drives, a SCSI controller 121 could be attached directly to the PCI bus 110 for coupling one or more SCSI hard drives 122 to the computer system S. The SCSI devices 122 can be mounted in the computer system S enclosure or be provided externally. The south bridge 114 USB host controller is connected to a pair of USB connectors 124 for communicating with USB devices.

In the computer system S, the ISA bus 126 couples the south bridge 114 to a multifunction input/output (I/O) controller 128, a basic input/output system (BIOS) ROM, and a number of ISA slots 132 for receiving expansion cards. The multifunction controller 128 includes a number of functions, such as a floppy disk drive controller for connecting to a floppy disk drive 134; a keyboard controller for connecting to a keyboard 136 and a mouse 138; a serial communications controller for providing at least one serial port 140; and a parallel port interface for providing at least one parallel port 142.

Figure 2:
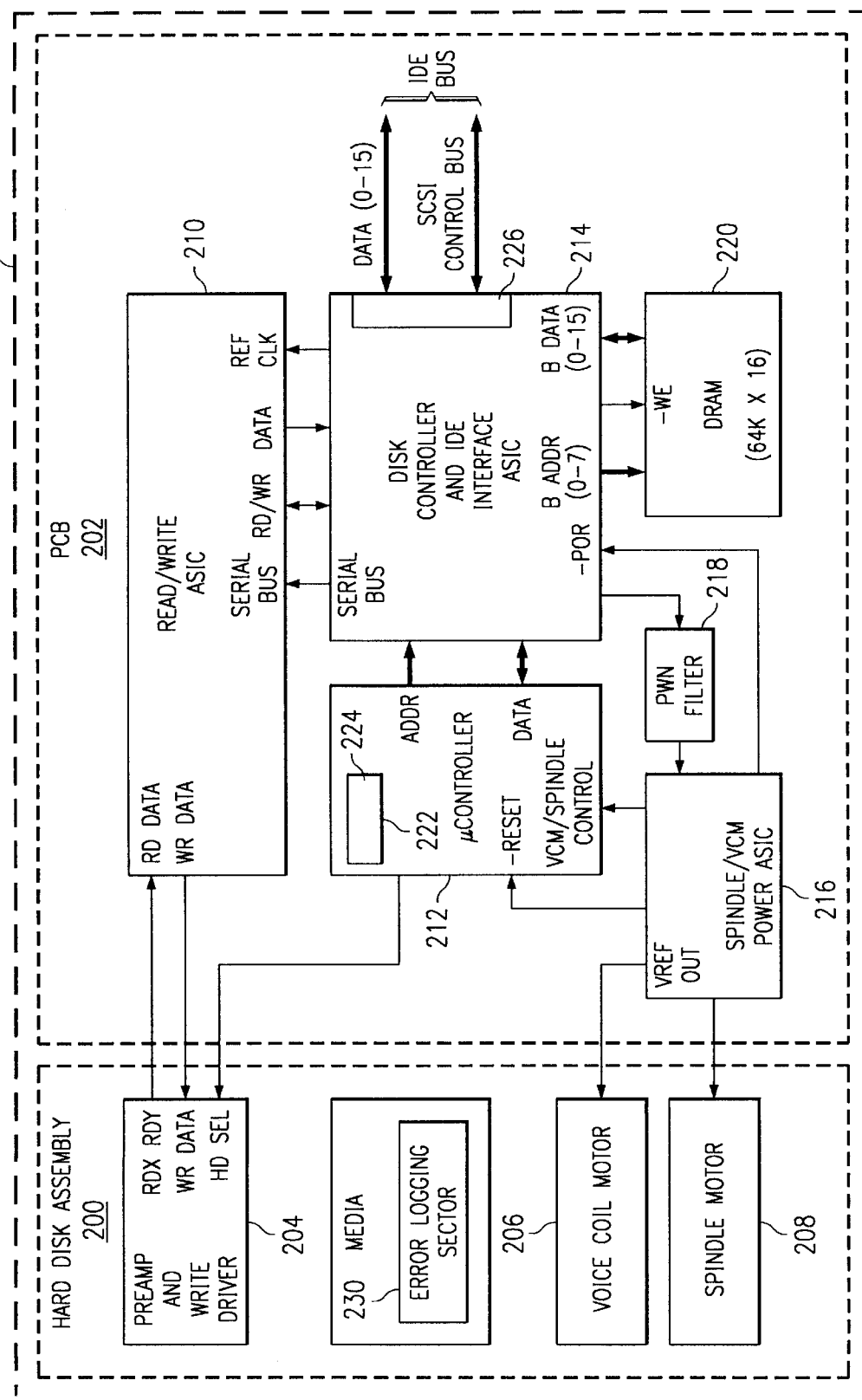
FIG. 2 is a block diagram of a storage device according to a preferred embodiment.

Referring now to FIG. 2, there is illustrated a block diagram of the hard disk drive 118. It is understood that while a typical IDE disk drive is illustrated and discussed here, the principles disclosed herein can apply equally to SCSI and other types of storage devices, such as CD-ROM and Digital Versatile Disk (DVD), especially writable CD-ROM and DVD drives. Additionally, it is understood that the many different versions of SCSI, IDE or ATA do not limit the present invention.

The hard disk drive 118 includes a head/disk assembly 200 and a printed circuit board (PCB) assembly 202. The head/disk assembly 200 includes a number of mechanical subassemblies which are sealed under a metal cover and not illustrated here such as, a spindle motor assembly, a disk stack assembly, a headstack assembly, a rotary positioner assembly, an automatic actuator lock and an air filter. The headstack assembly consists of read/write heads electrically coupled to a read preamplifier and write driver circuit 204. The rotary positioner assembly includes a voice coil motor (VCM) 206 for positioning the read/write heads. The spindle motor assembly includes a spindle motor 208.

The PCB assembly 202 includes a read/write controller 210, a microcontroller 212, a disk controller and WDE interface 214, a spindle/VCM power driver 216, a pulse width modulator (PWM) filter 218 and a memory 220. Memory 220 preferably comprises dynamic random access memory (DRAM) but other memories such as static RAM, erasable programmable read only memory (EPROM), electrically erasable ROM or even a magnetic memory (e.g., hard drive) could be used.

The read/write controller 210 provides write data precompensation and read channel processing functions for the drive 118.

The microcontroller 212 provides local processor services to the drive electronics under program control. The microcontroller 212 manages the resources of the disk controller and IDE interface 214, the read/write controller 210, and the spindle/VCM power driver 216. The microcontroller 212 includes an internal memory 222 (e.g., ROM) providing program code that the microcontroller 212 executes to complete a drive spinup and recalibration procedure, after which the microcontroller 212 reads additional control code from the disk and stores it in the memory 220. Alternatively, the memory 222 could be external from the microcontroller 212 and could contain the additional control code. As a further alternative, the program code and control code could be downloaded by the processor 100 into memory 220. Hereinafter, the collective control code and program code will be referred to as code 224.

The disk controller and IDE interface 214 provides control functions to the drive 118 under the direction of the microcontroller 212. The disk controller and IDE interface 214 includes an analog-to-digital (A/D) converter, an error correction and detection controller, a sequencer, a buffer controller, a microcontroller interface, a servo controller including PWM, a serial interface and an IDE interface controller 226. The IDE interface controller 226 provides data handling, bus control, and transfer management services for the bus connecting the hard disk drive 118 to the south bridge 114, which is know as the IDE bus or ATA bus. The processor 100 writes to registers contained in the IDE interface controller 226 when transmitting commands to the drive 118 and reads from the registers to retrieve status. Data may be transmitted through the programmed I/O registers or through DMA mechanisms. The IDE interface 226 preferably conforms to one or more of the following ATA specifications hereby incorporated by reference herein:

1. ATA-1: AT Attachment Interface for Disk Drives, document ANSI X3.221-1994;
2. ATA-2: AT Attachment Interface with Extensions, document ANSI X3.279-1996;
3. ATA-3: the AT Attachment-3 Interface, document ANSI X3.298-1997; and
4. ATA-4: the AT Attachment-4 Interface, document ANSI X3.xxx-1998.

The error correction and detection controller preferably utilizes a Reed-Solomon encoder/decoder scheme that is used for disk read/write operations to correct multiple bit errors per sector, but the present invention is not limited to a particular type of error correction code (ECC).

The spindle/VCM power driver 216 provides control signals to the VCM 206 and spindle motor 208. The PWM filter 218 receives a PWM signal from the disk controller and IDE interface 214 to output to the spindle/VCM power driver 216 to control the motion of the read/write heads.

Referring now to FIGS. 3A–C, there are illustrated a SMART subcommand to control and monitor various aspects of the present invention. One skilled in the art of IDE or ATA hard drives will understand that SMART subcommands are accessed through a SMART command B0h of the ATA command set, as defined in the various ATA specifications identified above. Recall that ATA commands are issued by the processor 100 to the IDE interface controller 226, and in particular, a command block 300 of the IDE interface controller. The command block registers 300 are used for sending commands to the drive 118 or posting status from the drive 118.

As illustrated in FIG. 3A, these registers include the features 302, sector count 304, sector number 306, cylinder low 308, cylinder high 310, device/head 312, command 314, data registers 316, status register 317 and error register 318. While it is understood that SCSI devices have different commands, data structures and protocols which will result in a slightly different implementation, the principles of the present invention are easily practiced on SCSI devices by one of ordinary skill in the art.

Prior to writing any SMART command to the IDE interface controller 226, key values are written by the processor 100 into the cylinder low 308 and cylinder high 310 registers.

The SMART subcommands use a single command code (B0h) and are differentiated from one another by the value placed in a features register 302. In order to issue a command, the processor 100 will write the subcommand-specific code to the drive's features register 302 before writing the command code to the command register 314. The subcommands and a full description of their operation are contained in the SMART and ATA specifications and need not be repeated here.

Of particular interest to the present invention is the SMART subcommand entitled "Read Data Attribute Values," or sometimes just "SMART Read Data," which is preferably accessed by writing D0h in the features register (as shown in FIG. 3A). "Attributes" are the specific performance or calibration parameters that are used in analyzing the status of the drive 118. Attributes are selected based on that parameters' ability to contribute to the prediction of degrading or fault conditions for the drive 118. "Attribute values" are used to represent the relative reliability of individual performance or calibration attributes. Examples of monitorable attributes include, head-to-disk flying height, data throughput performance, spin-up time, re-allocated sector count, seek time performance, spin try recount, drive calibration retry count, ECC circuitry, error rates, and temperature. This subcommand causes the drive 118 to return the drive's device attribute values to the processor 100 or requester.

The device attribute data structure 320 returned is illustrated in FIG. 3B. A "Data Structure Revision Number" 322 identifies which version of this data structure is implemented by a particular drive 118. The "Data Structure Revision Number" for the present invention shall preferably be set to 0005h. Up to thirty different "Drive Attributes" 324 can be reported, each "Drive Attribute" 324 having a twelve byte data structure 340 that makes up the information for each individual attribute entry. The drive attribute data structure 340 of a "Drive Attribute" 324 is illustrated in greater detail in FIG. 3C and discussed below. Possible values for an "Off-line Data Collection Status" 326 are illustrated in FIG. 3D. Rather than scan the entire disk drive 118 in one operation, it is preferable to separate the operation into a number of smaller operations called segments. A "Total Time to Complete Next Segment" field 328 is a field preferably for holding a two byte value representing an average time in seconds to complete a segment or section of the scan. The average time is calculated and updated by the microcontroller 212 periodically, such as after every segment is scanned. An "Off-Line Data Collection Capability" indicator 330 is a one byte field further described below. A "Drive Failure Prediction Capability," sometimes called "SMART Capability," indicator 332 is defined in the SMART specification and is not repeated herein.

A "Drive Error Logging Capability" indicator 334 is a one byte field indicating whether SMART Driver Error Logging is supported. If the value of bit 0 equals one, then a SMART Driver Error Logging is implemented by the drive 118. If the value of bit 0 equals zero, then error logging is not implemented. The definitions and descriptions of the remaining bytes of the device attribute data structure 320 which are not specifically mentioned herein are found in the SMART specification.

The data structure 340 of a drive attribute 324 is illustrated in FIG. 3C. An attribute identification (ID) number field 342 identifies which attribute number is held by the drive attribute 324. According to the preferred embodiment, there are four attributes consisting of attribute identification (ID) numbers 1, 5, 197 and 198 which are contained in a attribute ID number register 342. The attribute ID numbers are not necessarily related to the attribute numbers of the drive attribute register 324, i.e., ID number 5 could be held as the 2nd drive attribute 324.

Attribute ID number 1 preferably corresponds to a "Raw Read Error Rate" measurement. The raw read error rate is preferably a normalized measurement value indicative of the frequency of read error occurrences.

Attribute ID number 5 preferably corresponds to a "Re-Allocated Sector Count" measurement. The re-allocated sector count is preferably a count value indicative of the number of re-allocated or bad sectors.

Attribute ID number 197 preferably corresponds to a "Current Pending Sector Count" measurement. Current Pending Sector Count holds a count of the total number of sectors in the drive's "pending" list. The pending list is a typical list kept by the drive 118 to flag a potentially bad sector that needs to be validated on the next write operation and either reallocated and added to a "defective list" (sometimes called "G-list") or determined to be acceptable and removed from the pending list.

Attribute ID number 198 preferably corresponds to a "Off-Line Scan Uncorrectable Sector Count" measurement. Off-line Scan Uncorrectable Sector Count indicates the number of new sectors that have been detected to have uncorrectable read errors during the last read scan. At the beginning of each read operation the drive 118 resets the count to zero and accumulates in this attribute the number of new uncorrectable errors during the entire read scan operation.

The status flag 344 may include a pre-failure warranty bit, an on-line collection bit, a performance bit, an error rate attribute type bit, an event count attribute type bit and a self-preserving attribute type bit.

The attribute value 346 includes raw attribute values which may be useful to the host, such as the number of power-on hours.

Referring now to FIG. 3E, there is illustrated a bit-mapped field corresponding to the "Off-Line Data Collection Capability" indicator 330. If the value of bit 0 equals one, then a SMART Execute Off-Line Immediate subcommand is implemented by the drive 118. If the value of bit 0 equals zero, then the subcommand is not implemented. If the value of bit 1 equals one, then a SMART Enable Disable Automatic Off-Line subcommand is implemented by the drive 118. If the value of bit 0 equals zero, then the subcommand is not implemented. If the value of bit 1 equals one, then the drive 118 aborts all off-line data collection activity initiated by a SMART Execute Off-Line Immediate command upon receipt of a new command. Off-line data collection activity must be restarted by a new SMART Execute Off-Line Immediate subcommand from the host. If the value of bit 0 equals zero, then the drive 118 suspends off-line data collection activity after some predetermined event. The reader is referred to the SMART specification for more details on these subcommands. If the value of bit 3 equals one, then a SMART Off-Line Read Scanning With Defect Reallocation subcommand is implemented by the drive 118. If the value of bit 0 equals zero, then the subcommand is not implemented.

Of additional interest to the present invention is the SMART subcommand entitled "Execute Off-Line Immediate," which is executable by writing D4h in the features register shown in FIG. 3A. In response to an "Execute Off-Line Immediate" command, the drive 118 completes an entire off-line read scan. This feature is particularly useful during diagnostics test of the drive 118.

Of additional interest to the present invention is the SMART subcommand entitled "Enable/Disable Automatic Off-Line Data Collection," which is executable by writing DBh in the features register shown in FIG. 3A.

Of additional interest to the present invention is a command entitled "Retrieve SMART Drive Error Log," which is preferably accessible by setting the command register 314 to B0h, features register 302 to D5h, the cylinder low register 308 to 4Fh, the cylinder high register 310 to C2h, the sector number register 306 to 01h and setting the sector count register 304 to an appropriate logging sector number 400. The logging sector number 400 is illustrated in greater detail in FIG. 4A and discussed below.

According to the preferred embodiment, an error log is created and maintained by the microcontroller 212 in memory 220. The error log comprises a predetermined number of commands executed prior to an error as well as the command that caused the error. Once an error is detected, the microcontroller 212 writes the error log to a non-volatile memory, such as the logging sector 400 or alternatively an EEPROM, Flash ROM, or battery backed static RAM, and preferably keeps an extra copy for fault tolerance. A count of the number of errors is also kept.

For purposes of the error log, an error includes most errors trackable by the drive 118 including ATA errors (error bit "ERR" in the status register 317 set to one), uncorrectable data errors (UNC), requested ID not found (IDNF) errors, servo errors, write fault errors, read errors and hardware and software resets.

The retrieve SMART drive error log subcommand causes the drive 118 to return an error logging sector data structure 410, such as the one illustrated in FIG. 4B, to the processor 100 or requester. Contained in the error logging sector data structure 410 is a drive error logging version number 412 (set to one), a error log data structure pointer 414, a predetermined number of error log data structures 416, an ATA device error count 418 and a data structure checksum 420.

The error log data structure pointer 414 points to the most recent error log data structure 416 contained in the error log data structure 410. The error log data structure 416 entries are viewed as a circular buffer with a predetermined number of entries, such as five. An error log data structure pointer 414 value of zero indicates there are no valid error log data structures 416. Values of 1–5 are valid and values over 5 are reserved and invalid (if only five entries are desired). More specifically, the first error is logged into the first error log data structure 416; the second error is logged into the second error log data structure 416, etc. If five entries are kept, the sixth error replaces the first error logged. Unused error log data structures 416 are initialized to zero.

The ATA device error count indicator 418 is a two byte field for containing and maintaining a count of the absolute number of errors detected by the drive 118.

Referring now to FIG. 4C, there is illustrated the error log data structure 416 comprising a predetermined number of command data structures 418 and an error data structure 420.

Referring now to FIG. 4D, there is illustrated in greater detail the command data structure 418. The command data structure 418 preferably includes values from the features register 302, sector count register 304, sector number register 306, cylinder low register 308, cylinder high register 310, device/head register 312 and the command register 314 taken at the time the command was executed. A device control register is set to FFh if a hardware reset occurs, thereby providing an indication distinguishable from a soft reset. A command timestamp field 424 is reflective of the time in milliseconds from power on that the command was executed. The field is reset to zero after every power cycle.

Referring now to FIG. 4E, there is illustrated in greater detail the error data structure 420. The error data structure 420 preferably includes values from the error register 318, sector count register 304, sector number register 306, cylinder low register 308, cylinder high register 310, device/head register 312 and the status register 317. An extended error data field 426 preferably includes multiple bytes of predetermined error condition code. A state field 428 is preferably a bit map field for holding a value indicative of an operating state of the drive 118 at the time an error occurs. The preferred bit definitions for the state field 428 are illustrated in FIG. 4F. A life timestamp field 430 is reflective of the number of hours after power-on the error occurred, as indicated by a SMART power-on hours timer (not shown).

Figure 5A:
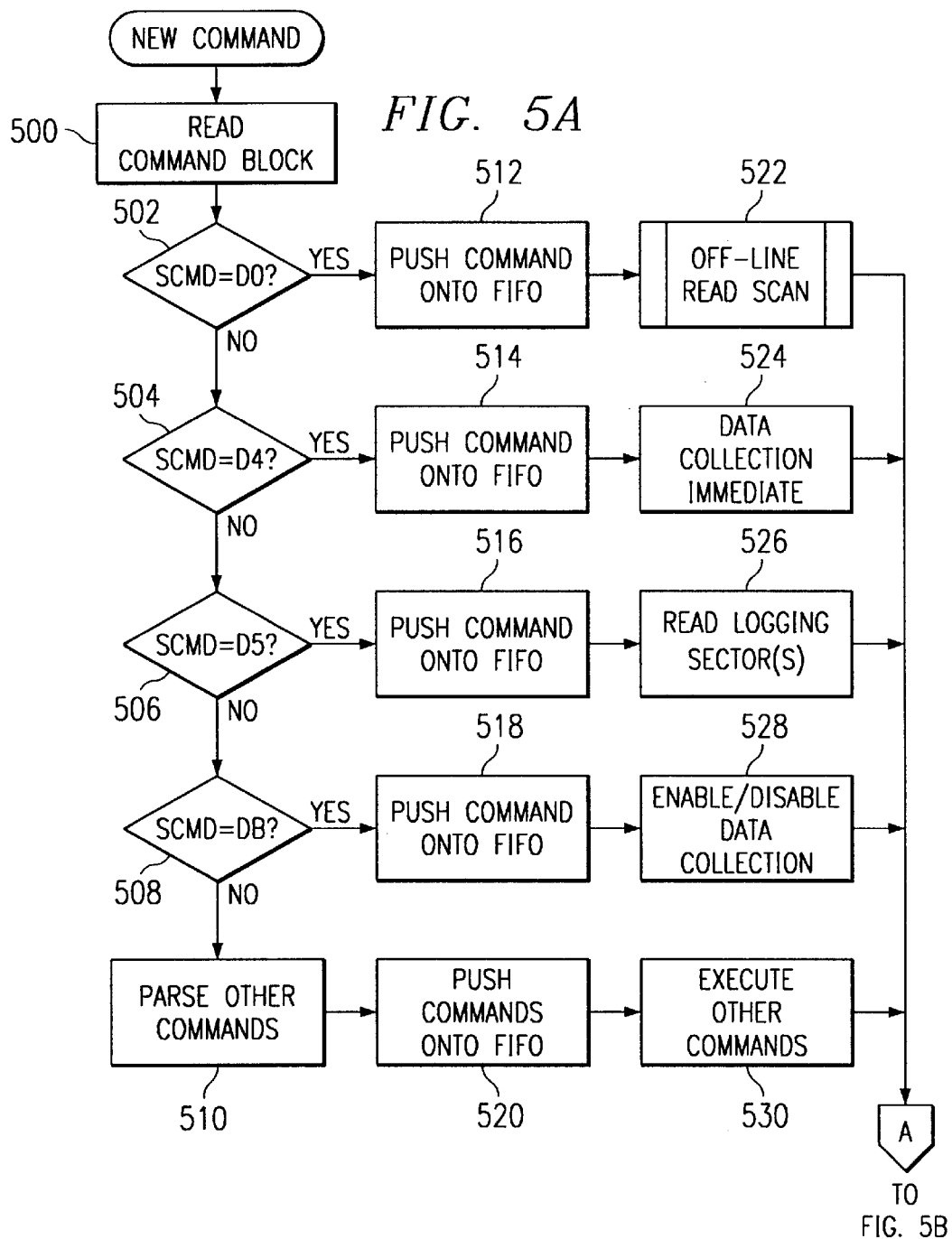
FIGS. 5A–B are flow charts illustrating a method for processing and developing an error log, according to a preferred embodiment.
Figure 5B:
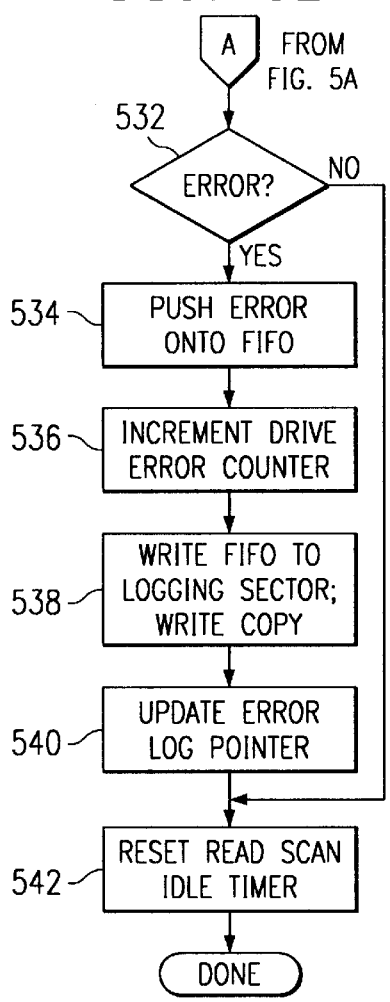

Referring now to FIGS. 5A–B, there are illustrated flow charts depicting a method of detecting drive failures according to the preferred embodiment. The processes described below are preferably performed by routines stored in memory 222 and executed by the microcontroller 212, but alternatively, the process could be performed by dedicated hardware, or a combination of hardware and software as known to one of ordinary skill in the art of hardware design.

When a new command is received by the drive 118, the command block 300 is parsed to determine which command has been received. Although the drive 118 is capable of responding to at least the ATA command set, for simplicity those ATA commands are not shown. At a step 500, the microcontroller 212 reads the command block and proceeds to step 502. At steps 502–510, the microcontroller determines which command has been received.

In general, after the commands have been identified in steps 502–510, the process continues to steps 512–520 where the microcontroller 212 records the command in the error log data structure 416 for the purpose of tracking command history, as discussed above with reference to FIG. 4D. Preferably, the error log data structure 416 is temporarily created in memory 220 before being written to the drive 118. This helps minimize the impact to drive performance. Alternatively, the error log data structure 416 could be stored in other volatile or non-volatile memories, such as a FIFO (first-in-first-out) memory; a writable non-volatile memory, such as electrically erasable programmable read only memory (EEPROM), or an alternate sector on the drive 118. The information recorded includes the values identified in the command data structure 418. At the time the command is recorded, the microcontroller 212 preferably also records the time that the command was issued by the host. As another variation, the command could be recorded after execution of the command.

SMART commands are distinguishable from other commands by a "B0h" command code, as shown in FIG. 3A. SMART commands are distinguishable from each other by a subcommand value written into the features register 302.

At step 502, if the microcontroller determines that the SMART subcommand is a "D0h," the microcontroller 212 proceeds to step 512 to record the command and onto step 522 where a SMART read attribute values command is executed. At step 522, the microcontroller 212 returns the drive's 118 attribute values to the host. If at step 502, the microcontroller determines that the command is not a "D0h," the process continues to step 504.

At step 504, if the microcontroller determines that the SMART subcommand is a "D4h," the microcontroller 212 proceeds to step 514 to record the command and onto step 524 to execute an off-line data collection immediate command, discussed below. The off-line data collection immediate command causes the drive 118 to complete an off-line read scan of the entire drive 118. If at step 502, the microcontroller determines that the command is not a "D4h," the process continues to step 506.

At step 506, if the microcontroller determines that the SMART subcommand is a "D5h," the microcontroller 212 proceeds to step 516 to record the command and onto step 526 to execute a read logging sectors command. At step 526, the microcontroller 212 returns the drive's 118 error logging sector data structure 410 to the host. If at step 506, the microcontroller determines that the command is not a "D5h," the process continues to step 508.

At step 508, if the microcontroller determines that the SMART subcommand is a "DBh," the microcontroller 212 proceeds to step 518 to record the command and onto step 528 to execute an enable/disable automatic off-line data collection command. This subcommand enables and disables the drive 118 to perform data collection activities that automatically collect attribute data in an off-line mode. If at step 508, the microcontroller determines that the command is not a "D0h," the process continues to step 510.

At step 510, if the microcontroller determines that a command other than one of the above four SMART subcommands has been issued, the microcontroller 212 proceeds to step 520 to record the command and onto step 530 to execute the command.

After the commands have been executed in steps 522–530, processing continues to step 532 (FIG. 5B) where the microcontroller determines if an error has occurred in the execution of the subject command. Errors are determined in a number of ways including, reading the status register 317. If an error has occurred, processing continues to step 534 where the microcontroller 212 records the error in the error log data structure 416 of memory 220. The error information recorded includes the values identified in the error data structure 420. When the error is recorded, the microcontroller 212 also records the time that the error was detected and the state of the drive 118. Processing continues from step 534 to step 536 where the microcontroller causes an ATA device error counter to be incremented. The ATA device error count is a number representing the total number of errors recorded during the life of the drive 118.

After updating the error data structure 420 in memory 220, the microcontroller proceeds to step 538 where the error log data structure 416 is copied to a non-volatile memory according to the error logging data structure 410. Preferably, the non-volatile memory is an error logging sector 230 of the drive 118, but other forms of non-volatile memory could be used. A second copy is made for fault tolerance purposes. The processing continues from step 538 to step 540 where the microcontroller updates the error log data structure pointer 414 according to the address where the error logging data structure 410 was written.

If in step 532 an error is not detected or if step 540 is complete, processing continues to step 542 where the microcontroller 212 causes a drive inactivity detector to reset. The drive inactivity detector is preferably a timer maintained by the microcontroller 212 for counting time between commands. When a command is received the timer is reset. If no commands are received, the timer continues to count seconds until a predetermined count is achieved and the drive 18 is deemed inactive. The performance of this step is not limited to the period of time after errors are detected—it could be performed anytime after a command is received. More details on usage of the timer are found with reference to FIG. 7.

Once the commands have been executed, the microcontroller 212 waits for another command and processes various background housekeeping tasks. One of these tasks is further described in FIG. 7 below.

Figure 6:
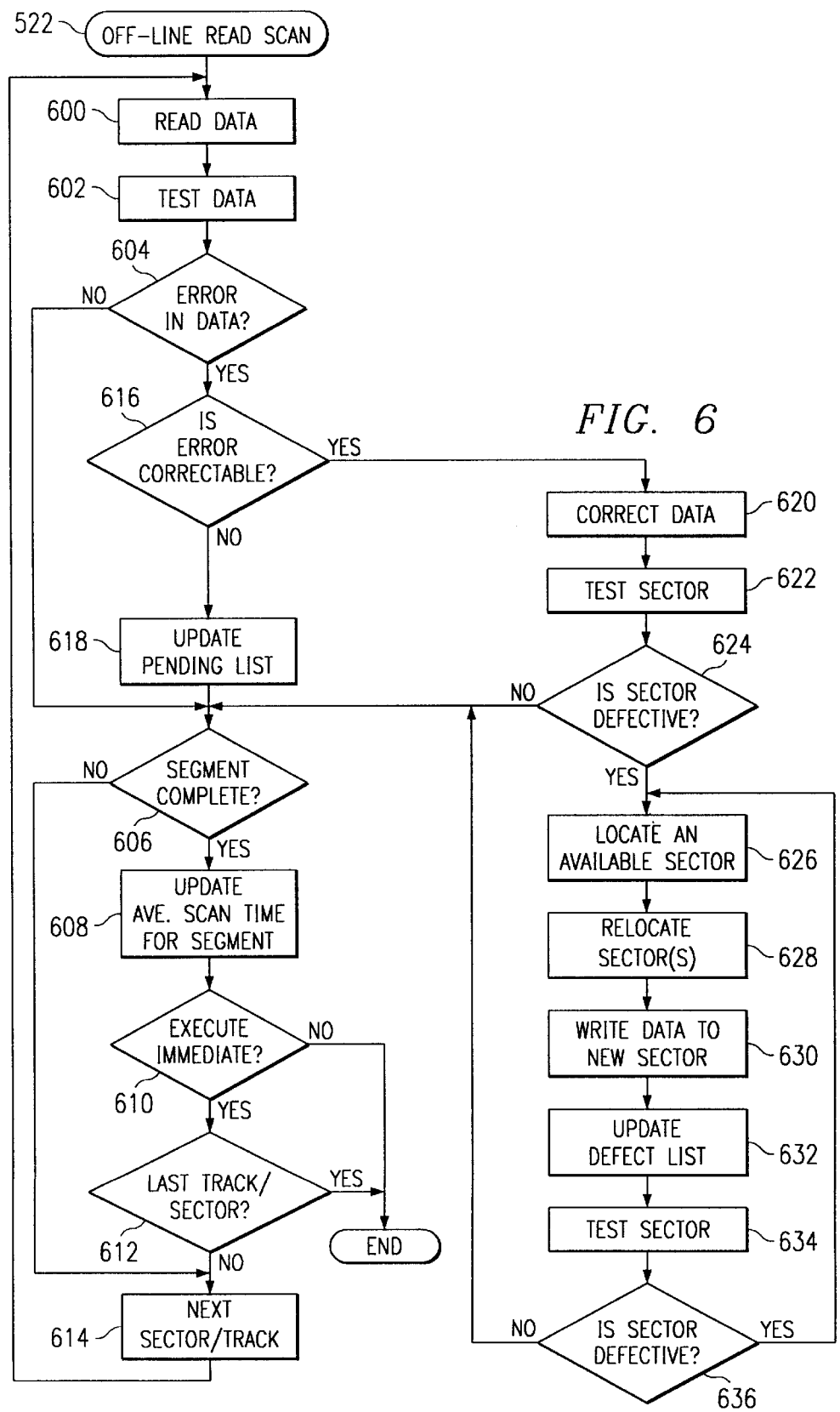
FIG. 6 is a flow chart illustrating an off-line read scan operation, according to the preferred embodiment.

Now referring to FIG. 6 there is illustrated a flow chart depicting a method of performing the off-line read scan technique according to the preferred embodiment. At a step 600, the microcontroller 212 begins by reading data from the drive 118. Preferably, at least a sector's worth of data, including the error checking bytes, is retrieved. Typically, to read a single sector, the drive 118 reads a track's worth of data even though only one sector is sought. At a step 602, the microcontroller 212 tests the data against its error checking codes according to conventional or proprietary error checking techniques, such as Reed-Solomon ECC with double and quadruple burst correction algorithms.

At step 604, the microcontroller examines the results of step 602 to determine if the data contained an error. If the data does not contain an error, processing continues to a step 606 where the microcontroller 212 determines whether the segment is complete. Recall that a segment is a convenient predetermined portion of the total number of sectors of the drive 118, such as the number of sectors contained in a track or cylinder. If the segment is not complete, processing continues to a step 614 where the next sector and/or track is selected. If at step 606 the segment is determined to be complete, processing continues to a step 608 where the microcontroller 212 calculates the elapsed time to scan the completed segment. The elapsed time value is written into the total time to complete next segment field 328. The preferably represents an average of the previously stored value and the newly calculated value, but alternatively the value can represent the elapsed time for the last segment scanned.

Processing continues from step 608 to step 610 where the microcontroller 212 determines whether the read scan is the result of an execute immediate read scan command. If so, then the entire drive 118 must be scanned and processing continues to a step 612. If not so, then the read scan operation is deemed to be a background task which is terminated after the segment is finished.

At step 612, the microcontroller 212 determines if the last sector has been read. If so, then the read scan is complete. If not so, processing continues to a step 614 where the next sector is selected before returning to step 600 to inspect the sector. It should be noted that segment boundaries are conveniently chosen to coincide with track/cylinder boundaries so that step 612 is inherent within step 606.

If at step 604 the microcontroller 212 determines that an error is contained in the data, processing continues to a step 616 where the microcontroller 212 determines whether the error is correctable. If not so, processing continues to a step 618 where the drive defect pending list is updated to include the sector containing the uncorrectable data. If the error is correctable, processing continues to a step 620 where the data is corrected and rewritten to the sector. Processing continues to step 622 where the sector is tested again to see if any errors are indicated. Sector testing can involve a number of read and write cycles to see if the error is repeatable.

At step 624, the microcontroller 212 determines if the sector is defective. If the error repeats after one or more rereads and rewrites, the microcontroller deems the sector defective and processing continues to a step 626. If the error does not repeat, processing continues to step 606.

At step 626, the microcontroller locates an available sector to reallocate the defective sector. The microcontroller 212 looks for available sectors in areas such as pools of spare sectors or unused sectors. Once an available sector is located, processing continues to a step 628 where the microcontroller 212 relocates the old sector to the new sector. Processing continues from step 628 to step 630 where the microcontroller 212 writes the data into the new sector. Processing continues to step 632 where the microcontroller 212 updates the defect pending list to include the defective sector. Processing continues to step 634 where the microcontroller 212 tests the new sector to make sure the data is read correctly.

At step 636, the microcontroller 212 determines if the sector is defective. If an error repeats after one or more rereads and rewrites, the microcontroller 212 deems the sector defective and processing returns back to step 626 to select another sector. If an error is not present or does not repeat, processing continues to step 606 to continue scanning.

Figure 7:
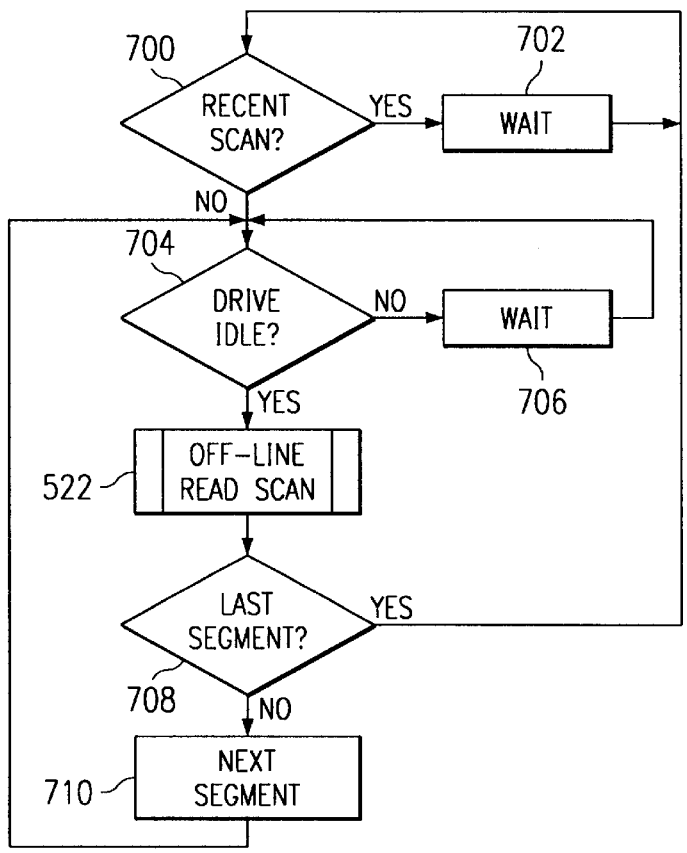
FIG. 7 is a flow chart illustrating a background routine for triggering an off-line read scan operation, according to the preferred embodiment.

Now referring to FIG. 7, there is illustrated a flow chart depicting a background or idle task of the microcontroller 212. At a step 700, the microcontroller 212 determines if a scan has been performed recently. The drive 118 is scanned according to a predetermined frequency of at least once a week and preferably once every number of active hours, such as eight hours of activity or usage. The drive 118 is deemed active when the platters are spinning. Alternatively, activity could be based on on-time. If the drive 118 has been scanned within the last activity period (such as eight hours), processing continues to a step 702 where the microcontroller 212 waits for a predetermined period of time, such as one minute, before proceeding back to step 700 to test again.

If at step 700, the microcontroller 212 determines that a scan has not been performed recently in accordance with the frequency schedule, processing continues to a step 704 where the microcontroller 212 determines if the drive 118 is inactive or idle (not executing host-initiated commands). It is preferable to perform the background read scanning while the drive 118 is not being used. Periods of inactivity can exist for as little as microsecond and for as long as hours. Typically, the longer the drive 118 is idle, the higher the probability that the drive will remain idle. The microcontroller uses a predetermined timeout value, such as 15 seconds, to detect when the drive is idle. If at step 704 the microcontroller 212 determines that the drive 118 is idle, processing continues to step 522 where an off-line read scan is performed for one or more segments. Preferably the off-line read scan is performed during an idle period but before the drive 118 is placed into a low power state, such as when the drive is spun down.

After an off-line read scan is performed, processing continues to a step 708 where the microcontroller 212 determines if the last segment has been scanned. If so, processing continues back to step 700 to wait for the next scheduled scan. If all segments have not yet been scanned, then processing continues to a step 710 where the next segment is selected and processing continues to step 704 to check for drive inactivity.

Although FIG. 7 shows a process where the microcontroller branches out of the off-line read scan after scanning each segment, alternatively the scanning can continue (without branching back to step 704) until the drive 118 receives a command. As another variation, the polling performed by the microcontroller 212, such as with the timers, can be performed by separate hardware providing interrupts to the microcontroller 212.

Thus there has been described and illustrated herein, method and apparatus for logging errors in a storage device. However, those skilled in the art should recognize that many modifications and variations in the size, shape, materials, components, circuit elements, wiring connections and contacts besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of repairing defects in a computer storage device accessible by a processor, the storage device having a storage disk addressable in portions, the method comprising:
   (a) during operation of said computer, detecting a predetermined period of inactivity in accessing said storage device by said processor;
   (b) then scanning at least a said portion of the disk for defects; and
   (c) relocating the data from a defective portion to a non-defective portion of the disk if a defective portion is found.

2. The method of claim 1, further including:
   (d) repeating said steps (a)–(c) after predetermined periods of storage device activity.

3. The method of claim 1, wherein step (c) includes:
   (e) error checking any data stored in said at least one portion of the disk;
   (f) testing the data to determine if an error is present; and
   (g) testing the said at least one portion of the disk to determine the presence of any disk defects.

4. The method of claim 3, wherein the storage device maintains a defect list identifying defective disk portions, the method further comprising:
   (h) if an error is present in the scanned portion, determining if the error is correctable;
   (i) correcting the error if the error is correctable; and
   (j) adding the scanned portion to the defect list if the error is not correctable.

5. The method of claim 3, further comprising:
   (k) if an error is not present, continuing to scan further portions of the disk for defects.

6. The method of claim 3, wherein the storage device maintains a defect list identifying defective disk portions, the method further comprising:
   (l) adding the scanned portion to the defect list if the scanned portion portion is defective.

7. The method of claim 1, wherein the storage device maintains a defect list identifying defective disk portions, the method further comprising:
   (m) if the scanned portion is defective, locating an available disk portion from a pool of available disk portions;
   (n) copying the data from the defective disk portion to the located available disk portion; and
   (o) adding the defective disk portion to the defect list.

8. A method of repairing defects in a computer storage device accessible by a processor, the storage device having a storage disk addressable in portions, the method comprising:
   (a) during operation of said computer, detecting a predetermined period of inactivity in accessing said storage device by said processor;
   (b) then scanning at least a said portion of the disk for defects;
   (c) if the scanned disk portion is defective, locating an available disk portion from a pool of available disk portions;
   (d) testing the located available disk portion to determine if it is defective;
   (e) repeating steps (c)–(d) if the located available disk portion is defective;
   (f) copying the data from the defective scanned disk portion to a located non-defective available disk portion; and
   (g) adding the defective disk portion to the defect list.

9. A method of repairing defects in a computer storage device accessible by a processor, the storage device having a storage disk addressable in portions, the method comprising:
   a) during operation of said computer, detecting a predetermined period of inactivity in accessing said storage device by said processor;
   (b) then successively scanning a plurality of said portions of the disk for defects; and
   (c) relocating the data from a defective portion to a non-defective portion of the disk if a defective portion is found;
   (d) calculating the elapsed time to scan each of said plurality of disk portions; and
   (e) after scanning each disk portion, updating an average scan time value maintained by the storage device before continuing to scan another of said plurality of disk portions.

10. A storage device, comprising:
    a memory for storing data, the memory being addressable in portions;
    a controller operable to write data to the memory, wait for a predetermined period of storage device idle time, then to scan the memory for defects after the predetermined period of idle time and relocate data from a defective portion to a non-defective portion if a defective portion is detected, wherein the controller is further operable to periodically repeat said scan and relocate operations after predetermined periods of storage device activity.

11. The storage device of claim 10, where the predetermined period of storage device activity is based on storage device powered-on time.

12. The storage device of claim 10, where the predetermined period of storage device activity is based on storage device spin time.

13. The storage device of claim 10, wherein the controller is further operable to read the data contained in a said portion, test the data to determine if an error is present, and test the portion to determine if the memory is defective.

14. The storage device of claim 13, wherein the storage device maintains a defect list identifying defective portions and wherein if data error is determined to be present in a said portion, the controller is further operable to determine if the error is correctable, correct the error if the error is correctable, and add said portion to the defect list if the error is not correctable.

15. The storage device of claim 13, wherein if an error is not determined to be present, the controller is further operable to continue scanning the memory for defects.

16. The storage device of claim 13, wherein the storage device maintains a defect list identifying defective memory portions and wherein the controller is farther operable to add the memory portion to the defect list if the memory portion is determined to be defective.

17. The storage device of claim 10, wherein the storage device maintains a defect list identifying defective memory portions and wherein if a memory portion is determined to be defective the controller is further operable to locate a first available memory portion from a pool of available memory portions, copy the data from the defective memory portion to the first available memory portion, and to add the defective memory portion to the defect list.

18. The storage device of claim 17, wherein the controller is further operable to test the first available memory portion to determine if it is defective, and to locate a next available memory portion from a pool of available memory portions and copy the data from the defective memory portion to the next available memory portion if the first available memory portion is defective.

19. The storage device of claim 10 wherein the storage device maintains a scan time value indicative of an average time to scan one or more of said memory portions and wherein the controller is further operable to calculate the period of time to scan each of said one or more memory portions and update the scan time value before continuing to scan the media.

20. A computer system, comprising: a processor; a main memory coupled to the processor; a storage device coupled to the main memory and processor, the storage device including a storage disk that can be accessed for write and read operations; and a controller operable during operations of said computer, to detect and in response to a predetermined period of inactivity in accessing said storage device, to scan subsegments of a segment of the storage disk to detect defects while there is continuing inactivity in accessing said storage device, and to relocate data from a detected defective subsegment to a non-defective subsegment.

21. The computer system of claim 20, wherein the controller is further operable to read the data contained in a said subsegment, test the data to determine if an error is present, and test the subsegment to determine if the storage disk is defective.

22. The computer system of claim 21, wherein the storage device maintains a defect list identifying defective subsegment and wherein if a data error is detected in a scanned subsegment, the controller is further operable to determine if the data error is correctable, correct the data error if the error is correctable, and add the subsegment to the defect list if the data error is not correctable.

23. The computer system of claim 21, wherein if an error is not detected, the controller is further operable to continue scanning subsegments the for defects.

24. The computer system of claim 21, wherein the storage device maintains a defect list identifying defective subsegments and wherein the controller is further operable to add a subsegment the to the defect list if that subsegment is detected as defective.

25. The computer system of claim 20, wherein the storage device maintains a defect list identifying defective subsegments and wherein if a scanned subsegment is detected as defective the controller is further operable to locate a first available subsegment from a pool of available subsegments, copy data from the defective subsegment to the first available subsegment and add the defective subsegment to the defect list.

26. A computer system comprising:

a processor;

a main memory coupled to the processor; a storage device coupled to the main memory and processor, the storage device including a storage disk that can be accessed for write and read operations; and a controller operable during operations of said computer after respective periods of activity of said storage device, to detect and in response to a predetermined period of inactivity in accessing said storage device, to scan subsegments of a segment of the storage disk to detect defects while there is continuing inactivity in accessing said storage device, and to relocate data from a detected defective subsegment to a non-defective subsegment; the said period of activity being significantly longer than said period of inactivity.

27. A computer system comprising:

a processor;

a main memory coupled to the processor; a storage device coupled to the main memory and processor, the storage device including a storage disk that can be accessed for write and read operations; and a controller operable during operations of said computer, to detect and in response to a predetermined period of inactivity in accessing said storage device, to scan subsegments of a segment of the storage disk to detect defects while there is continuing inactivity in accessing said storage device, and to relocate data from a detected defective subsegment to a non-defective subsegment; wherein:

the storage device maintains a defect list identifying defective subsegments and wherein if a scanned subsegment is detected as defective the controller is further operable to locate a first available subsegment from a pool of available subsegments, copy data from the defective subsegment to the first available subsegment and add the defective subsegment to the defect list; and wherein the controller is further operable to test the first available subsegment to determine if it is defective, and to locate a next available subsegment from a pool of available subsegments and copy the data from the defective subsegment to the next available subsegment if the first available subsegment is defective.

28. A computer system comprising:

a processor;

a main memory coupled to the processor; a storage device coupled to the main memory and processor, the storage device including a storage disk that can be accessed for write and read operations; and a controller operable during operations of said computer, to detect and in response to a predetermined period of inactivity in accessing said storage device, to scan subsegments of a segment of the storage disk to detect defects while there is continuing inactivity in accessing said storage device, and to relocate data from a detected defective subsegment to a non-defective subsegment wherein:

the storage device maintains a scan time value indicative of an average time to scan one or more subsegments and the controller is further operable to calculate the period of time to scan each of said one or more portions and update the scan time value before continuing to scan the storage disk.

29. A computer system, comprising: a processor; a main memory coupled to the processor; a storage device coupled to the main memory and processor, the storage device responsive to processor commands, said storage device including a storage disk having addressable sectors; and a controller operable during operation of the computer system to detect and respond to a predetermined period of inactivity of the storage device determined by the absence of processor commands to the storage device, to initiate a scanning routine to detect defects by scanning a disk sector and to relocate to another available sector, data from a scanned disk sector determined to be defective, said controller being responsive to detection of no defects in a scanned disk sector by initiating a said scanning routine of another disk sector in said storage disk until scanning of all disk sectors in that storage disk segment has been completed.

30. The computer system of claim 29, wherein the controller continues said scanning routine on successive storage disk segments until either (a) scanning of all disk segments has been completed or (b) the disk drive receives a processor command.

31. The computer system of claim 30, wherein said controller is operable to initiate response to a said predetermined period of inactivity following predetermined activity periods that are significantly longer than said predetermined period of inactivity.

32. The computer system of claim 29, wherein said controller is operable to detect defects in said scanned disk sectors by detecting errors in stored data and by detecting storage device attribute values.

* * * * *